(12) United States Patent
Hong et al.

(10) Patent No.: US 12,693,537 B2
(45) Date of Patent: Jul. 28, 2026

(54) DISPLAY APPARATUS FOR PROVIDING EXPANDED VIEWING WINDOW

(71) Applicant: SAMSUNG ELECTRONICS CO., LTD., Suwon-si (KR)

(72) Inventors: Jong-Young Hong, Suwon-si (KR); Hongseok Lee, Seoul (KR); Young Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/025,347

(22) Filed: Jan. 16, 2025

(65) Prior Publication Data

US 2025/0164799 A1 May 22, 2025

Related U.S. Application Data

(62) Division of application No. 18/466,664, filed on Sep. 13, 2023, now Pat. No. 12,235,453, which is a
(Continued)

(30) Foreign Application Priority Data

Jun. 2, 2020 (KR) ........................ 10-2020-0066675

(51) Int. Cl.
*G02B 27/01* (2006.01)
*F21V 8/00* (2006.01)
(Continued)

(52) U.S. Cl.
CPC ........... *G02B 27/0172* (2013.01); *G02B 5/18* (2013.01); *G02B 6/0016* (2013.01);
(Continued)

(58) Field of Classification Search
CPC .. G02B 27/0081; G02B 27/01; G02B 27/017; G02B 27/0172; G02B 27/4205;
(Continued)

(56) References Cited

U.S. PATENT DOCUMENTS

| | | | |
|---|---|---|---|
| 6,437,919 | B1 | 8/2002 | Brown et al. |
| 8,233,204 | B1 | 7/2012 | Robbins et al. |

(Continued)

FOREIGN PATENT DOCUMENTS

| | | |
|---|---|---|
| CN | 106483660 A | 3/2017 |
| CN | 109425927 A | 3/2019 |

(Continued)

OTHER PUBLICATIONS

English Language Machine Translation of CN-106950697-B (Year: 2019).*

(Continued)

*Primary Examiner* — Jason M Mandeville
(74) *Attorney, Agent, or Firm* — Sughrue Mion, PLLC

(57) ABSTRACT

A display apparatus capable of providing an expanded viewing window includes a light guide plate including an input coupler and an output coupler; and an image providing apparatus facing the input coupler to provide an image to the input coupler. The input coupler may include a plurality of sub input couplers configured to propagate the image provided from the image providing apparatus at different angles in the light guide plate.

11 Claims, 15 Drawing Sheets

Related U.S. Application Data division of application No. 17/107,109, filed on Nov. 30, 2020, now Pat. No. 11,789,271.

(51) Int. Cl.

| | |
|---|---|
| *G02B 5/18* | (2006.01) |
| *G02B 27/00* | (2006.01) |
| *G02B 27/42* | (2006.01) |
| *G02B 27/44* | (2006.01) |
| *G02B 30/40* | (2020.01) |
| *H04N 9/31* | (2006.01) |

(52) U.S. Cl.
CPC ....... *G02B 6/0026* (2013.01); *G02B 27/0081* (2013.01); *G02B 27/4205* (2013.01); *G02B 27/44* (2013.01); *G02B 30/40* (2020.01); *H04N 9/3152* (2013.01); *G02B 2005/1804* (2013.01); *G02B 5/1819* (2013.01); *G02B 2027/0123* (2013.01); *G02B 2027/0125* (2013.01); *G02B 2027/0174* (2013.01); *G02B 2027/0178* (2013.01)

(58) Field of Classification Search
CPC ............ G02B 27/44; G02B 2027/0123; G02B 2027/0125; G02B 2027/0174; G02B 2027/0178; G02B 30/40; G02B 5/18; G02B 5/1819; G02B 6/0011; G02B 6/0013; G02B 6/0016; G02B 6/0026; G02B 2005/1804; H04N 9/3152; G09G 3/3433; G09G 3/3473
USPC .......................................................... 345/8
See application file for complete search history.

(56)     References Cited

U.S. PATENT DOCUMENTS

| | | | |
|---|---|---|---|
| 10,197,810 | B2 | 2/2019 | Seo et al. |
| 10,254,542 | B2 | 4/2019 | Kollin et al. |
| 10,509,241 | B1 | 12/2019 | Robbins et al. |
| 10,585,287 | B2 | 3/2020 | Lee et al. |
| 10,598,938 | B1 | 3/2020 | Huang et al. |
| 11,789,271 | B2 | 10/2023 | Hong et al. |
| 2006/0279662 | A1 | 12/2006 | Kapellner et al. |
| 2010/0202034 | A1 | 8/2010 | Freeman et al. |
| 2017/0185037 | A1 | 6/2017 | Lee et al. |
| 2017/0276940 | A1 | 9/2017 | Popovich et al. |
| 2017/0357101 | A1 | 12/2017 | Tervo et al. |
| 2018/0113309 | A1 | 4/2018 | Robbins et al. |
| 2018/0120559 | A1 | 5/2018 | Yeoh et al. |
| 2018/0120563 | A1 | 5/2018 | Kollin et al. |
| 2018/0129166 | A1 | 5/2018 | Seo et al. |
| 2018/0210222 | A1 | 7/2018 | Seo et al. |
| 2018/0275411 | A1 | 9/2018 | Schowengerdt et al. |
| 2018/0373115 | A1 | 12/2018 | Brown et al. |
| 2019/0064420 | A1 | 2/2019 | Lee et al. |
| 2019/0379868 | A1 | 12/2019 | Lin et al. |
| 2020/0166691 | A1 | 5/2020 | Vartiainen et al. |
| 2020/0183079 | A1 | 6/2020 | Leister |
| 2020/0288093 | A1 | 9/2020 | Pertierra et al. |
| 2021/0003852 | A1 | 1/2021 | Kim et al. |
| 2021/0055327 | A1 | 2/2021 | Sengul et al. |

FOREIGN PATENT DOCUMENTS

| | | | | | |
|---|---|---|---|---|---|
| CN | 109891332 | A | | 6/2019 | |
| CN | 106950697 | B | * | 8/2019 | ......... G02B 27/0101 |
| CN | 110168419 | A | | 8/2019 | |
| CN | 113302542 | A | | 8/2021 | |
| WO | 2018/211074 | A1 | | 11/2018 | |

OTHER PUBLICATIONS

Communication dated Jul. 12, 2021, issued by the European Patent Office in counterpart European Application No. 21153947.3.

Communication issued Nov. 19, 2021 by the European Patent Office in counterpart European Patent Application No. 21153947.3.

Hellman, Brandon et al., "Angular and spatial light modulation by single digital micromirror device for multi-image output and nearly-doubled étendue", Optics Express, Jul. 22, 2019, vol. 27, No. 15, pp. 21477-21496, XP055790824. (20 pages total).

Notice of Allowance issued in parent U.S. Appl. No. 17/107,109 mailed Aug. 7, 2023.

Office Action issued in parent U.S. Appl. No. 17/107,109 mailed Apr. 14, 2022.

Office Action issued in parent U.S. Appl. No. 17/107,109 mailed Jan. 26, 2023.

Office Action issued in parent U.S. Appl. No. 17/107,109 mailed Oct. 14, 2022.

Yu Wentao et al., "Augmented reality three-dimensional display system based on holographic optical element", Chinese Journal of Lasers, vol. 43, Issue 10, Oct. 2016, 7 pages.

Office Action issued on May 23, 2025 by the China National Intellectual Property Administration in Chinese Patent Application No. 202110047070.2.

Communication issued Mar. 10, 2025 by the Korean Intellectual Property Office in Korean Patent Application No. 10-2020-0066675.

* cited by examiner

DISPLAY APPARATUS FOR PROVIDING EXPANDED VIEWING WINDOW

CROSS-REFERENCE TO RELATED APPLICATION

This present application is a divisional of U.S. application Ser. No. 18/466,664 filed Sep. 13, 2023, which is a divisional of U.S. application Ser. No. 17/107, 109 filed on Nov. 30, 2020, now U.S. Pat. No. 11,789,271 issued on Oct. 17, 2023, which claims priority to Korean Patent Application No. 10-2020-0066675, filed on Jun. 2, 2020, in the Korean Intellectual Property Office, the disclosures of which are incorporated by reference herein in their entirety.

BACKGROUND

1. Field

Example embodiments of the present disclosure relate to a display apparatus, and more particularly, to a display apparatus capable of providing an expanded viewing window.

2. Description of Related Art

Recently, as electronic devices and display apparatuses capable of providing virtual reality (VR) images have been developed, interest in VR has increased. As a next step in relation to VR, technologies to provide augmented reality (AR) and mixed reality (MR) have been studied.

Unlike VR that refers to a complete virtual world, AR is a display technology that further increases an effect of reality by overlapping (combining) virtual objects or information on an environment of the real world. Considering that VR is limitedly applicable to fields such as games or virtual experiences, AR may be applicable to various real environments. In particular, AR has drawn attention as a next generation display technique suitable for a ubiquitous environment or an internet of things (IoT) environment. AR may be an example of MR in that AR mixes the real world and additional information (virtual world).

AR display apparatuses can be manufactured as near-eye display apparatuses, for example, glasses-type display apparatuses, head-mounted type display apparatuses, goggle-type display apparatuses, etc. Various optical structures have been studied to manufacture small and lightweight near-eye display apparatuses.

SUMMARY

One or more example embodiments provide a display apparatus capable of providing an expanded viewing window.

Additional aspects will be set forth in part in the description which follows and, in part, will be apparent from the description, or may be learned by practice of the presented embodiments of the disclosure.

According to an aspect of an example embodiment, a display apparatus includes a light guide plate including an input coupler and an output coupler; and an image providing apparatus facing the input coupler and configured to provide an image to the input coupler, wherein the input coupler includes a plurality of sub input couplers configured to propagate an image provided from the image providing apparatus at different angles in the light guide plate.

The image providing apparatus may include a spatial light modulator including a plurality of display regions respectively corresponding to the plurality of sub input couplers; and a light source configured to provide coherent illumination light to the spatial light modulator.

The spatial light modulator may further include a plurality of non-display regions between the plurality of display regions.

The spatial light modulator may be configured to display a same image on each of the plurality of display regions or to display images at different viewpoints on the plurality of display regions, respectively.

The display apparatus may further include a diffraction grating disposed between the light source and the spatial light modulator, the diffraction grating being configured to diffract the coherent illumination light incident from the light source such that a traveling direction of the coherent illumination light incident on each display region of the plurality of display regions of the spatial light modulator is different from traveling directions of the coherent illumination light incident on other display regions of the plurality of display regions.

A size of the diffraction grating may be greater than a size of the spatial light modulator.

The diffraction grating may be configured to diffract the coherent illumination light into a $-1^{st}$ order portion, a $0^{th}$ order portion, and a $+1^{st}$ order portion, and the plurality of display regions of the spatial light modulator may include a first display region on which the $-1^{st}$ order portion of the coherent illumination light is incident, a second display region on which the $0^{th}$ order portion of the coherent illumination light is incident, and a third display region on which the $+1^{st}$ order portion of the coherent illumination light is incident.

The plurality of display regions of the spatial light modulator may include a first display region, a second display region, and a third display region, and the plurality of sub input couplers may include a first sub input coupler on which a first image that is $-1$st order diffracted by the first display region is incident, a second sub input coupler on which a second image that is 0th order diffracted by the second display region is incident, and a third sub input coupler on which a third image that is $+1$st order diffracted by the third display region is incident.

A size of the first display region may be greater than a size of the first sub input coupler, a size of the second display region may be greater than a size of the second sub input coupler, and a size of the third display region may be greater than a size of the third sub input coupler.

The image providing apparatus may include a plurality of spatial light modulators respectively corresponding to the plurality of sub input couplers, the plurality of spatial light modulators being separated from each other; and a light source configured to provide coherent illumination light to each spatial light modulator of the plurality of spatial light modulators.

The plurality of sub input couplers may be two-dimensionally arranged on a surface of the light guide plate, and the plurality of spatial light modulators may be two-dimensionally arranged on a same plane as each other, and each spatial light modulator of the plurality of spatial light modulators may face a respective sub input coupler of the plurality of sub input couplers.

The light source may include a plurality of light sources configured to respectively provide the coherent illumination light to the plurality of spatial light modulators.

Each light source of the plurality of light sources may be configured to provide a respective color of coherent illumination light different from the respective color of coherent illumination light of each other light source of the plurality of light sources.

The image providing apparatus may include an image scanner configured to sequentially or simultaneously provide a plurality of images to the plurality of sub input couplers.

The input coupler may include a first input coupler including a plurality of first sub input couplers; and a second input coupler including a plurality of second sub input couplers, and the image providing apparatus may include a first image providing apparatus including a spatial light modulator disposed to face the first input coupler and a light source configured to provide coherent illumination light to the spatial light modulator; and a second image providing apparatus including an image scanner disposed to face the second input coupler.

The light guide plate may further include an intermediate coupler disposed in an optical path between the input coupler and the output coupler, wherein the input coupler is configured to output light in a first direction in the light guide plate, wherein the intermediate coupler is configured to output light in a second direction perpendicular to the first direction in the light guide plate, and wherein the output coupler is configured to output light to the outside of the light guide plate in a third direction perpendicular to the first direction and the second direction.

The display apparatus may include a virtual reality display apparatus, an augmented reality display apparatus, or a mixed reality display apparatus and may include a head mounted device, a glasses device, or a goggles device.

According to an aspect of an example embodiment, a display apparatus includes a light guide plate including an input coupler and an output coupler; and an image providing apparatus configured to provide a plurality of images traveling in different directions to the input coupler.

The image providing apparatus may include a spatial light modulator facing the input coupler and including a plurality of display regions configured to provide the plurality of images to the input coupler; a light source configured to provide coherent illumination light to the spatial light modulator; and a diffraction grating disposed between the light source and the spatial light modulator, the diffraction grating being configured to diffract the coherent illumination light incident from the light source such that a traveling direction of the coherent illumination light incident on each display region of the plurality of display regions of the spatial light modulator is different from traveling directions of the coherent illumination light incident on other display regions of the plurality of display regions.

A size of the diffraction grating may be greater than a size of the spatial light modulator, and the size of the spatial light modulator may be greater than a size of the input coupler.

The diffraction grating may be configured to diffract the coherent illumination light into a $-1^{st}$ order portion, a $0^{th}$ order portion, and a $+1^{st}$ order portion, and the plurality of display regions of the spatial light modulator may include a first display region on which the $-1^{st}$ order portion of the coherent illumination light is incident, a second display region on which the $0^{th}$ order portion of the coherent illumination light is incident, and a third display region on which the $+1^{st}$ order portion of the coherent illumination light is incident.

The input coupler may include a first sub input coupler corresponding to the first display region of the spatial light modulator, a second sub input coupler corresponding to the second display region of the spatial light modulator, and a third sub input coupler corresponding to the third display region of the spatial light modulator, and the first, second, and third sub input couplers may be configured to propagate the plurality of images provided from the spatial light modulator at different respective angles in the light guide plate.

A size of the first display region may be greater than a size of the first sub input coupler, a size of the second display region may be greater than a size of the second sub input coupler, and a size of the third display region may be greater than a size of the third sub input coupler.

The diffraction grating may include a plurality of diffraction gratings respectively corresponding to the plurality of display regions of the spatial light modulator, the plurality of diffraction gratings being configured to diffract the coherent illumination light in the different respective directions.

The image providing apparatus may include a spatial light modulator facing the input coupler and including a plurality of display regions configured to provide the plurality of images to the input coupler; a light source configured to provide coherent illumination light to the spatial light modulator; and a diffraction grating disposed between the input coupler and the spatial light modulator, wherein each display region of the plurality of display regions is configured to provide a respective image of the plurality of images to the diffraction grating, and wherein the diffraction grating is configured to diffract each provided image in a different respective direction to be incident on the input coupler.

The plurality of display regions of the spatial light modulator may include a first display region, a second display region, and a third display region, and the diffraction grating may be configured to output a $-1st$ order diffraction of a first image provided by the first display region to propagate the first image to the input coupler, to output a $0th$ order diffraction of a second image provided by the second display region to propagate the second image to the input coupler, and to output a $+1st$ order diffraction of a third image provided by the third display region to propagate the third image to the input coupler.

A size of the diffraction grating may be greater than a size of the input coupler.

The image providing apparatus may include a spatial light modulator facing the input coupler and including a plurality of display regions configured to provide the plurality of images to the input coupler; a light source configured to provide coherent illumination light to the spatial light modulator; and a diffraction grating configured to diffract the coherent illumination light incident from the light source such that a traveling direction of the coherent illumination light incident on each display region of the plurality of display regions of the spatial light modulator is different from traveling directions of the coherent illumination light incident on other display regions of the plurality of display regions, wherein the light guide plate is disposed between the light source and the spatial light modulator, wherein the diffraction grating is disposed between the light source and the light guide plate, and wherein the spatial light modulator includes a reflective spatial light modulator.

The image providing apparatus may include a plurality of spatial light modulators facing the input coupler, wherein the plurality of spatial light modulators are separated from each other and are configured to provide the plurality of images to the input coupler; a light source configured to provide coherent illumination light to each spatial light modulator of the plurality of spatial light modulators; and a diffraction grating disposed between the light source and the plurality of spatial light modulators, the diffraction grating being configured to diffract the coherent illumination light incident from the light source such that a traveling direction of the coherent illumination light incident on each spatial light modulator of the plurality of spatial light modulators is different from traveling directions of the coherent illumination light incident on other spatial light modulators of the plurality of spatial light modulators.

The image providing apparatus may include a plurality of image scanners facing the input coupler and configured to provide the plurality of images; and a diffraction grating disposed between each image scanner of the plurality of image scanners and the input coupler, the diffraction grating being configured to diffract the plurality of images provided by the plurality of image scanners in different respective propagating directions to be incident on the input coupler.

The image providing apparatus may include a spatial light modulator facing the input coupler and comprising a plurality of display regions configured to provide the plurality of images to the input coupler; and a light source configured to provide coherent illumination light to the spatial light modulator, and the spatial light modulator may be arranged such that each display region of the plurality of display regions is configured to provide a respective image to the input coupler, each respective image being formed by a different respective diffraction order.

A size of the spatial light modulator may be larger than a size of the input coupler.

The plurality of display regions of the spatial light modulator may include a first display region configured to provide a first image formed by a −1st order diffraction of the coherent illumination light to the input coupler, a second display region configured to provide a second image formed by a 0th order diffraction of the coherent illumination light to the input coupler, and a third display region configured to provide a third image formed by a +1st order diffraction of the coherent illumination light to the input coupler.

The input coupler may include a first sub input coupler corresponding to the first display region of the spatial light modulator, a second sub input coupler corresponding to the second display region of the spatial light modulator, and a third sub input coupler corresponding to the third display region of the spatial light modulator.

According to an aspect of an example embodiment, an image providing apparatus includes a light source; a spatial light modulator including a plurality of regions, each region of the plurality of regions being configured to receive light output by the light source and to output a respective image; and an optical element configured change a traveling direction of incident light such that the image providing apparatus outputs the respective image of each region in different respective traveling directions.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figures 1, 2:
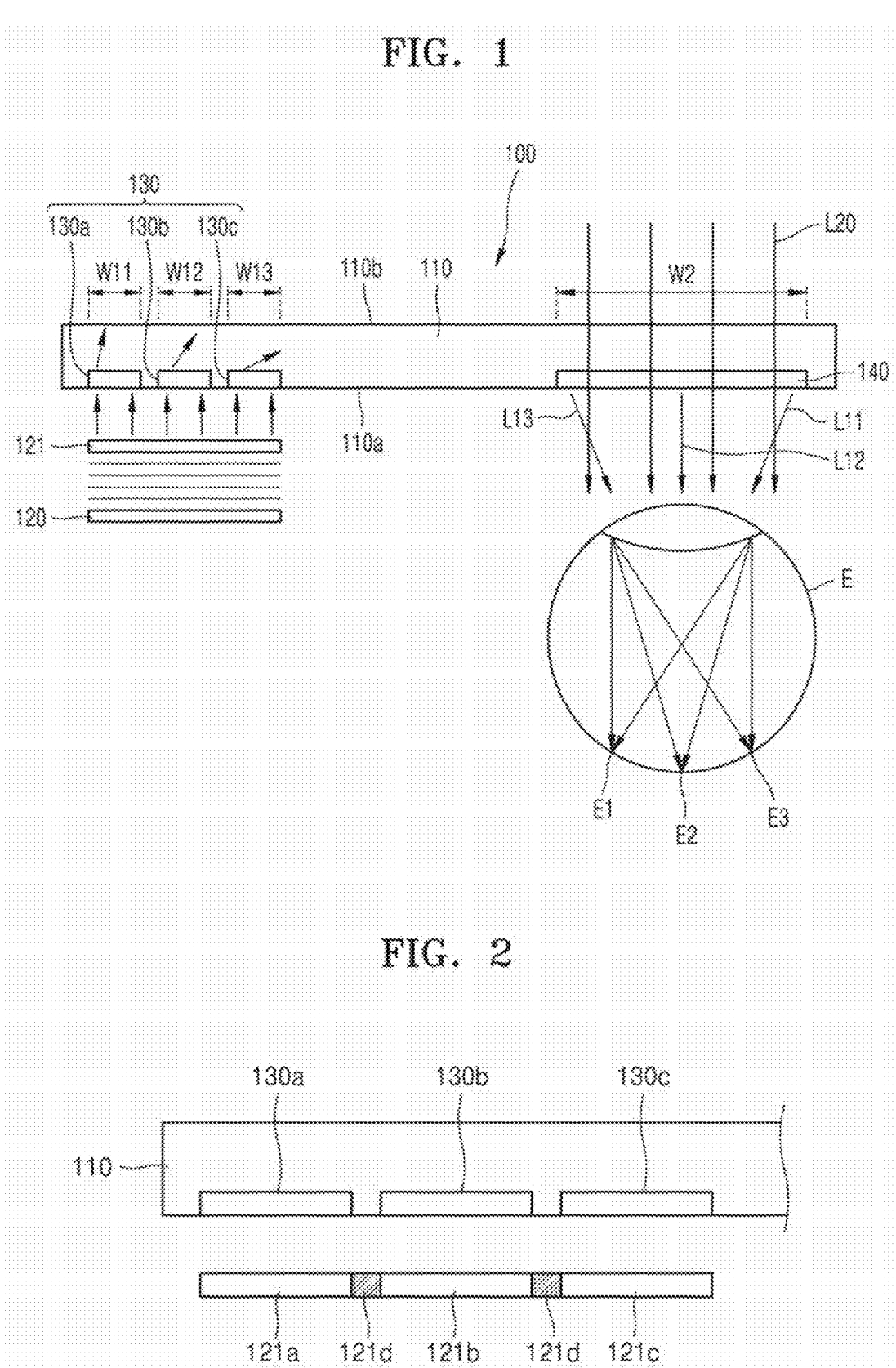
FIG. 1 is a view schematically illustrating a structure of a display apparatus according to an example embodiment.
FIG. 2 is a cross-sectional view showing in more detail structures of an input coupler and a spatial light modulator of the display apparatus shown in FIG. 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, display apparatuses for providing expanded viewing windows will be described with reference to the accompanying drawings. In the drawings, like reference numerals refer to like elements throughout and sizes of constituent elements may be exaggerated for convenience of explanation and the clarity of the specification.

It will also be understood that when an element is referred to as being "on" or "above" another element, the element may be in direct contact with the other element or other intervening elements may be present. In the following description, the singular forms include the plural forms unless the context clearly indicates otherwise. It should be understood that, when a part "comprises" or "includes" an element in the specification, unless otherwise defined, other elements are not excluded from the part and the part may further include other elements.

The use of terms "a" and "an" and "the" and similar referents in the context of describing the disclosure (especially in the context of the following claims) are to be construed to cover both the singular and the plural. The operations of all methods described herein can be performed in any suitable order unless otherwise indicated herein or otherwise clearly contradicted by context and are not necessarily limited to the described order.

Also, in the specification, the term "units" or " . . . modules" denote units or modules that process at least one function or operation, and may be realized by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language provided herein, is intended merely to better illuminate the disclosure and does not pose a limitation on the scope of the disclosure unless otherwise claimed.

FIG. 1 is a view schematically illustrating a structure of a display apparatus 100 according to an example embodiment. The display apparatus 100 according to an example embodiment may include a light guide plate 110 including an input coupler 130 and an output coupler 140 and an image providing apparatus (e.g., elements 120 and 121 as shown in FIG. 1) disposed to face the input coupler 130 to provide an image to the input coupler 130.

The light guide plate 110 may include a material transparent to visible light such that the light guide plate 110 may function as a waveguide for transmitting light. For example, the light guide plate 110 may include a material such as glass, poly methyl methacrylate (PMMA), or polydimethylsiloxane (PDMS). In addition, the light guide plate 110 may have a flat and even plate shape. The light guide plate 110 may include a first surface 110a and a second surface 110b, which is opposite the first surface 110a. The input coupler 130 may be configured to guide incident light obliquely to the inside of the light guide plate 110 and the output coupler 140 may be configured to output light propagating obliquely in the light guide plate 110 to the outside of the light guide plate 110. The input coupler 130 and the output coupler 140 may be arranged on the first surface 110a of the light guide plate 110. For example, as shown in FIG. 1, the input coupler 130 may be arranged on one end of the first surface 110a of the light guide plate 110, and the output coupler 140 may be arranged on the other end of the first surface 110a of the light guide plate 110.

The input coupler 130 is configured such that light incident on the input coupler 130 is obliquely guided to the inside of the light guide plate 110. Light guided into the light guide plate 110 propagates along the inside of the light guide plate 110 while being repeatedly totally reflected by the first surface 110a and the second surface 110b of the light guide plate 110. The output coupler 140 is configured such that light obliquely incident on the output coupler 140 is output to the outside of the light guide plate 110. The output coupler 140 may be configured to act only on light which is obliquely incident on the surface of the output coupler 140 within a predetermined incident angle range and may be configured not to act on light which is perpendicularly incident on the surface of the output coupler 140. In other words, the output coupler 140 may simply act as a transparent plate for light incident perpendicularly on the surface of the output coupler 140.

Each of the input coupler 130 and the output coupler 140 may include a diffractive optical element (DOE) or a holographic optical element (HOE). The DOE includes a plurality of periodic fine grating patterns. The grating patterns of the DOE act as a diffraction grating to diffract incident light. In particular, according to the size, height, period, etc. of the grating patterns, light incident at a predetermined angle range may be diffracted and subjected to destructive interference and constructive interference, and thus, the propagation direction of the light may be changed. In addition, the HOE includes periodic fine patterns of materials having different refractive indexes instead of including grating patterns. The HOE may be different only in structure from the DOE and may have the same operating principle as the DOE. In other words, light output by the DOE may be influenced by properties of the grating patterns while light output by the HOE may be influenced by the refractive indexes of the materials used.

In the structure of the light guide plate 110, light incident on the input coupler 130 exits the light guide plate 110 through the output coupler 140. In addition, the directivity of light which is incident on the input coupler 130 and output through the output coupler 140 may be maintained within a coupling angle range of the input coupler 130. Therefore, the light guide plate 110 may deliver the image provided by the image providing apparatus to a viewer's eye E.

The image providing apparatus may include a spatial light modulator 121 and a light source 120 providing coherent illumination light to the spatial light modulator 121. The spatial light modulator 121 may display a hologram pattern according to a hologram data signal such as a computer generated hologram (CGH) signal provided from an image processor. The coherent illumination light emitted from the light source 120 and incident on the spatial light modulator 121 may be diffracted by the hologram pattern that is displayed on a screen of the spatial light modulator 121, and an image may be reproduced through destructive interference and constructive interference of the diffracted illumination light. The image may be a general 2D image or a holographic image having a 3D effect.

Because the direction in which light is diffracted changes according to the hologram pattern displayed on the screen of the spatial light modulator 121, the spatial light modulator 121 may be used to adjust the direction in which the reproduced image propagates. For example, the spatial light modulator 121 may provide a plurality of images having different viewpoints to the input coupler 130 in different directions using a time division method. Then, the plurality of images having different viewpoints are incident on the input coupler 130 at different incidence angles, and pass through the light guide plate 110 to the viewer's eye E at different angles through the output coupler 140. Therefore, it is unnecessary to dispose a separate lens optical system for changing the direction of light travel between the spatial light modulator 121 and the input coupler 130. If there is no lens optical system, because the spatial light modulator 121 may be disposed directly in front of the input coupler 130, it is possible to implement the display apparatus 100 with a small volume.

The light source 120 may be a coherent light source configured to emit coherent light such that coherent light that is incident on the spatial light modulator 121 may be diffracted and subjected to interference. To provide light having high coherence, for example, a laser diode (LD) may be used as the light source 120. In addition, the light source 120 may be a light emitting diode (LED). The LED has lower spatial coherence than lasers, but light having only some spatial coherence may be sufficiently diffracted and modulated by the spatial light modulator 121. In addition to the LED, any other light source capable of emitting light having spatial coherence may be used as the light source 120.

The angular range in which the reproduced image travels may be generally limited by a diffraction angle limit of the spatial light modulator 121. In order to further extend the viewing angle of the display apparatus 100 beyond the diffraction angle limit of the spatial light modulator 121, the input coupler 130 may include a plurality of sub input couplers 130a, 130b, and 130c that incline and propagate the image provided from the spatial light modulator 121 at different angles within the light guide plate 110. Although the three sub input couplers 130a, 130b, and 130c are illustrated as examples in FIG. 1, the number of sub input couplers 130a, 130b, and 130c may be appropriately selected as necessary. The plurality of sub input couplers 130a, 130b, and 130c may be adjacent to each other and arranged side by side. In FIG. 1, the plurality of sub input couplers 130a, 130b, and 130c are completely separated from each other but are not limited thereto, and the adjacent sub input couplers 130a, 130b, and 130c may be disposed to be attached to each other without a gap.

The plurality of sub input couplers 130a, 130b, and 130c may be configured to incline incident light at different angles. For example, among the plurality of sub input couplers 130a, 130b, and 130c, the first sub input coupler 130a may incline the direction of the image incident from the spatial light modulator 121 by a first angle to provide the image to the light guide plate 110. In addition, the second sub input coupler 130b may incline the direction of the image incident from the spatial light modulator 121 by a second angle different from the first angle to provide the image to the light guide plate 110, and the third sub input coupler 130c may incline the direction of the image incident from the spatial light modulator 121 by a third angle different from the first angle and the second angle to provide the image to the light guide plate 110. To this end, the first to third sub input couplers 130a, 130b, and 130c may be formed as a DOE or HOE having different patterns.

Then, the images respectively incident on the first to third sub input couplers 130a, 130b, and 130c propagate at different angles within the light guide plate 110 with respect to the surface of the light guide plate 110, and are emitted at different angles through the output coupler 140. For example, an image L11 incident on the first sub input coupler 130a and emitted from the output coupler 140, an image L12 incident on the second sub input coupler 130b and emitted from the output coupler 140, and an image L13 incident on the third sub input coupler 130c and emitted from the output coupler 140 have different emission angles through the output coupler 140. Therefore, the images L11, L12, and L13 may be incident on the viewer's eye E at different angles and focused on different regions E1, E2, and E3 on the retina of the viewer's eye E, and thus the viewer may view an image with a wide viewing angle.

Further, according to an example embodiment, a width W2 of the output coupler 140 is greater than that of the input coupler 130. For example, the width W2 of the output coupler 140 is greater than the sum of widths W11, W12, and W13 of the first to third sub input couplers 130a, 130b, and 130c. Therefore, the width of the viewing window through which the viewer views images may be expanded. For example, the viewer's eye E does not need to be fixed relative to a specific point on the light guide plate 110, and when the viewer's eye E is located within the range of the width W2 of the output coupler 140, the viewer may sufficiently view images.

In addition, because the output coupler 140 acts as a diffraction grating only for light incident obliquely to the surface of the output coupler 140 and transmits light incident perpendicularly to the surface of the output coupler 140, the display apparatus 100 may be applied to realize augmented reality (AR) or mixed reality (MR). In this case, the display apparatus 100 may be a near-eye AR display apparatus. For example, the images L11, L12, and L13 which are reproduced by the spatial light modulator 121 may be viewed together with an external light L20 which contains an external foreground and perpendicularly passes through the output coupler 140.

FIG. 2 is a cross-sectional view showing in more detail structures of the input coupler 130 and the spatial light modulator 121 of the display apparatus 100 shown in FIG. 1. Referring to FIG. 2, the spatial light modulator 121 may include a plurality of display regions 121a, 121b, and 121c corresponding to the plurality of sub input couplers 130a, 130b, and 130c, respectively. The plurality of display regions 121a, 121b, and 121c of the spatial light modulator 121 may correspond to the plurality of sub input couplers 130a, 130b, and 130c, one-to-one, respectively. For example, the spatial light modulator 121 may include the first display region 121a corresponding to the first sub input coupler 130a, the second display region 121b corresponding to the second sub input coupler 130b, and the third display region 121c corresponding to the third sub input coupler 130c.

The spatial light modulator 121 includes a plurality of pixels two-dimensionally arranged. One spatial light modulator 121 may be logically divided into a plurality of regions, for example, the first to third display regions 121a, 121b, and 121c. The first to third display regions 121a, 121b, and 121c each include a plurality of pixels two-dimensionally arranged and may independently display a hologram pattern. For example, under the control of an image processing processor, the spatial light modulator 121 may independently display a hologram pattern on each of the first to third display regions 121a, 121b, and 121c.

The first to third display regions 121a, 121b, and 121c are disposed to face the first to third sub input couplers 130a, 130b, and 130c, respectively. Also, the first to third display regions 121a, 121b, and 121c may have widths equal to or slightly smaller than the widths W11, W12, and W13 of the first to third sub input couplers 130a, 130b, and 130c, respectively. The widths W11, W12, and W13 of the first to third sub input couplers 130a, 130b, and 130c may be the same as each other, but are not limited thereto, and may be designed differently as necessary.

The first display region 121a may correspond to the first sub input coupler 130a. Thus, an image reproduced by the first display region 121a may be incident on the first sub input coupler 130a and then guided to the inside of the light guide plate 110. In a similar manner, an image reproduced by the second display region 121b may be incident on the second sub input coupler 130b and then guided to the inside of the light guide plate 110, and an image reproduced by the third display region 121c may be incident on the third sub input coupler 130c and then guided to the inside of the light guide plate 110. Thereafter, the images reproduced by the first to third display regions 121a, 121b, and 121c may be emitted from the output coupler 140 at different angles, and may be respectively focused on different regions E1, E2, and E3 on the retina of the viewer's eye E. The images reproduced by the first to third display regions 121a, 121b, and 121c may be different images or may be the same image with different viewpoints. For example, the spatial light modulator 121 may operate to reproduce the same image or to reproduce images with different viewpoints in each of the first to third display regions 121a, 121b, and 121c under the control of the image processing processor.

When there is a gap between the adjacent sub input couplers 130a, 130b, and 130c, a gap may also exist between the adjacent display regions 121a, 121b, and 121c of the spatial light modulator 121. For example, the spatial light modulator 121 may further include non-display regions 121d disposed between the first display region 121a and the second display region 121b and between the second display region 121b and the third display region 121c. Each of the non-display regions 121d may include a plurality of pixels of the spatial light modulator 121. The pixels of the spatial light modulator 121 allocated to the non-display region 121d may operate not to display a hologram pattern under the control of the image processing processor.

In FIG. 2, one spatial light modulator 121 is logically divided into the plurality of display regions 121a, 121b, and 121c, but is not necessarily limited thereto. For example, a plurality of physically separate spatial light modulators respectively corresponding to the plurality of sub input couplers 130a, 130b, and 130c may be used. In addition, a plurality of physically separate light sources may also be used in addition to the spatial light modulator.

Figure 3:
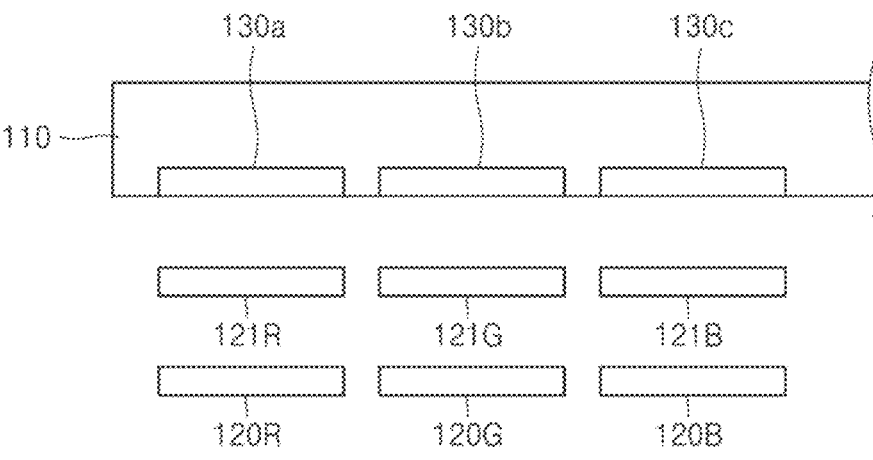
FIG. 3 shows an example of a structure of an image providing apparatus of the display apparatus according to an example embodiment.

For example, FIG. 3 shows an example of a structure of an image providing apparatus of a display apparatus according to an example embodiment. Referring to FIG. 3, the image providing apparatus may include a plurality of spatial light modulators 121R, 121G, and 121B that are separated from each other and that respectively correspond to the plurality of sub input couplers 130a, 130b, and 130c. The image providing apparatus may also include a plurality of light sources 120R, 120G, and 120B respectively providing coherent illumination light to the plurality of spatial light modulators 121R, 121G, and 121B. The plurality of light sources 120R, 120G, and 120B may provide illumination light of different colors. For example, the first light source 120R may provide red light to the first spatial light modulator 121R corresponding thereto, the second light source 120G may provide green light to the second spatial light modulator 121G corresponding thereto, and the third light source 120B may provide blue light to the third spatial light modulator 121B corresponding thereto. Then, the display apparatus may provide a viewer with an image of full color.

The plurality of light sources 120R, 120G, and 120B providing illumination light of different colors may also be applied to the example embodiment illustrated in FIG. 2. For example, the first light source 120R may be disposed to provide red light to the first display region 121a of the spatial light modulator 121. Also, the second light source 120G may be disposed to provide green light to the second display region 121b of the spatial light modulator 121, and the third light source 120B may be disposed to provide blue light to the third display region 121c of the spatial light modulator 121.

Figure 4:
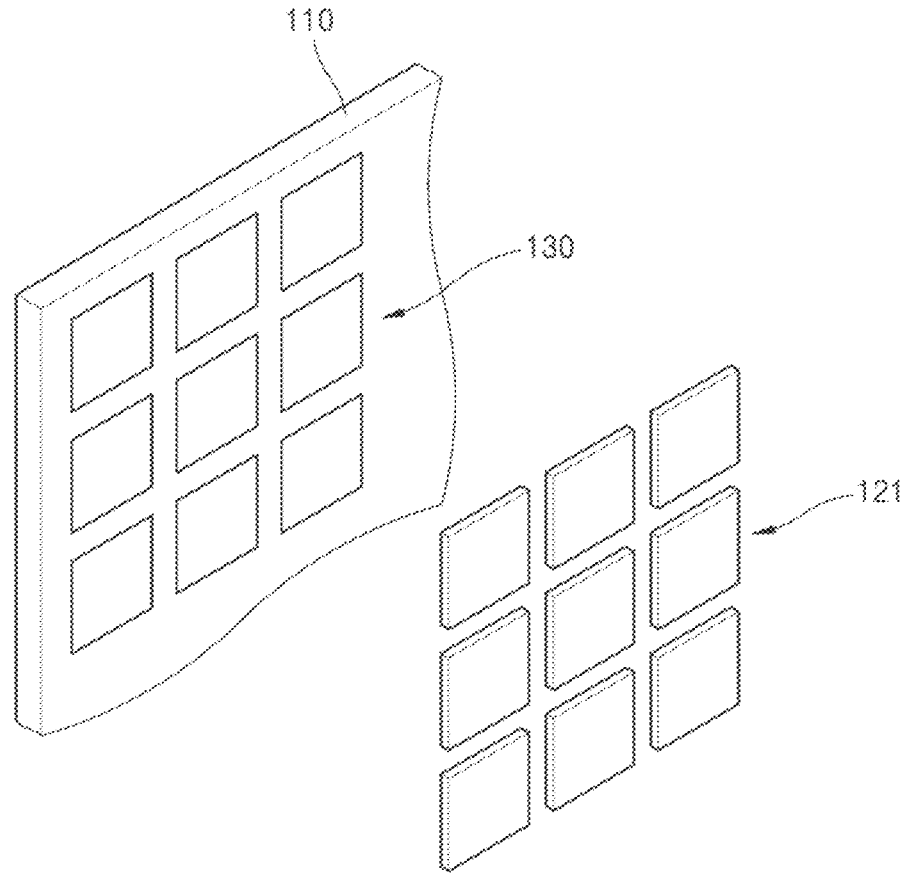
FIG. 4 shows an example of structures of an input coupler and a spatial light modulator of the display apparatus according to an example embodiment.

In FIGS. 1, 2, and 3, the three sub input couplers 130a, 130b, and 130c are one-dimensionally arranged, but are not necessarily limited thereto. For example, FIG. 4 shows an example of structures of the input coupler 130 and the spatial light modulator 121 of the display apparatus according to an example embodiment. As illustrated in FIG. 4, the input coupler 130 may include a plurality of sub input couplers two-dimensionally arranged on the surface of the light guide plate 110. In addition, the spatial light modulator 121 may include a plurality of individual spatial light modulators that are two-dimensionally arranged on the same plane as each other and facing the plurality of sub input couplers. Instead, a single spatial light modulator 121 may be logically divided into a plurality of display regions two-dimensionally arranged. In FIG. 4, the example of the sub input coupler and the spatial light modulators that are 3×3 arranged is illustrated, but is not necessarily limited thereto. Various arrangements, such as 2×2, 2×3, 4×4, etc. may be selected as needed. Although the plurality of sub input couplers may couple incident light into the light guide plate 110 at different angles, some sub input couplers may be designed to couple the incident light into the light guide plate 110 at the same angle.

Figure 5:
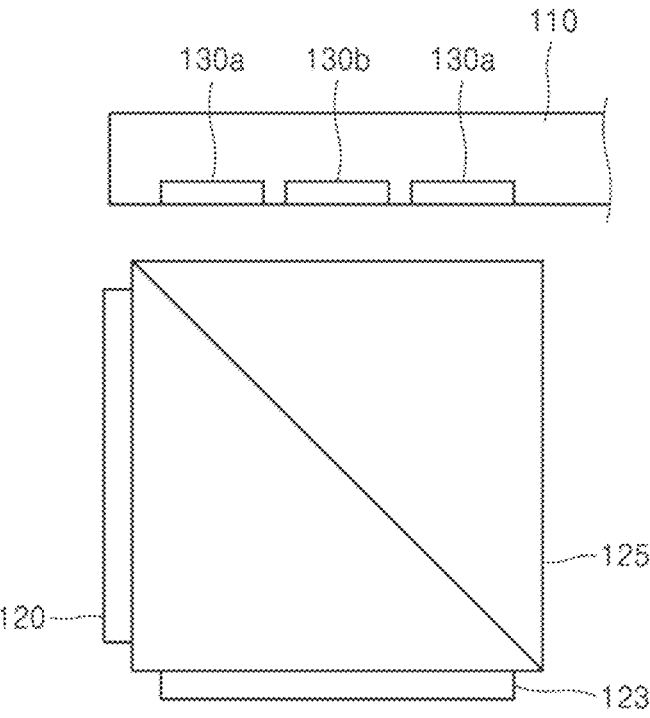
FIG. 5 shows an example of a structure of an image providing apparatus of the display apparatus according to an example embodiment.

The spatial light modulator 121 described above is a transmissive spatial light modulator that modulates while transmitting illumination light, but the spatial light modulator may not be transmissive. For example, FIG. 5 shows an example of a structure of an image providing apparatus of a display apparatus according to an example embodiment. Referring to FIG. 5, the image providing apparatus may include a beam splitter 125 disposed to face the input coupler 130, the light source 120 disposed on one side of the beam splitter 125, and a spatial light modulator 123 disposed on another side of the beam splitter 125. The spatial light modulator 123 is a reflective spatial light modulator that reflects and modulates illumination light.

The beam splitter 125 is configured to reflect light incident from the light source 120 to the spatial light modulator 123 and transmit light incident from the spatial light modulator 123 to the input coupler 130. The beam splitter 125 may be, for example, a half mirror that simply reflects half of incident light and transmits the other half of the incident light. Alternatively, the beam splitter 125 may be a polarization beam splitter having polarization selectivity. For example, the beam splitter 125 may be configured to reflect light having a first linear polarization component and transmit light having a second linear polarization component, which is orthogonal to the first linear polarization component.

The spatial light modulator 123 shown in FIG. 5 may also include a plurality of display regions as shown in FIG. 2. Instead, as shown in FIG. 3, a plurality of individual spatial light modulators 123 may be disposed on the same surface of the beam splitter 125. In addition, the plurality of light sources 120 that provide illumination light of different colors may be disposed on the same surface of the beam splitter 125.

Figure 6:
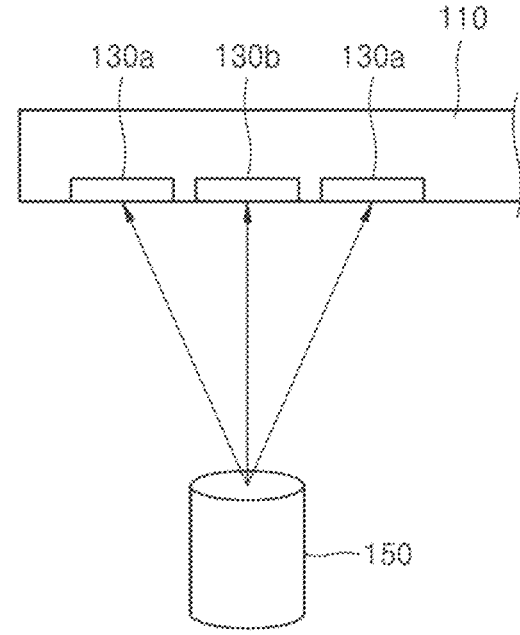
FIG. 6 shows an example of a structure of an image providing apparatus of the display apparatus according to an example embodiment.

FIG. 6 shows an example of a structure of an image providing apparatus of a display apparatus according to an example embodiment. The image providing apparatus is described to include a light source and a spatial light modulator, but is not necessarily limited thereto. For example, the image providing apparatus may include one image scanner 150. The image scanner 150 may be configured to sequentially or simultaneously provide images to the plurality of sub input couplers 130*a*, 130*b*, and 130*c*. For example, the image scanner 150 may include a display panel, a beam scanning unit, and a projector. The image scanner 150 may directly generate and sequentially scan a 2D color image to the plurality of sub input couplers 130*a*, 130*b*, and 130*c* according to a time division method. Alternatively, the image scanner 150 may simultaneously provide a plurality of images to the plurality of sub input couplers 130*a*, 130*b*, and 130*c*.

Figure 7:
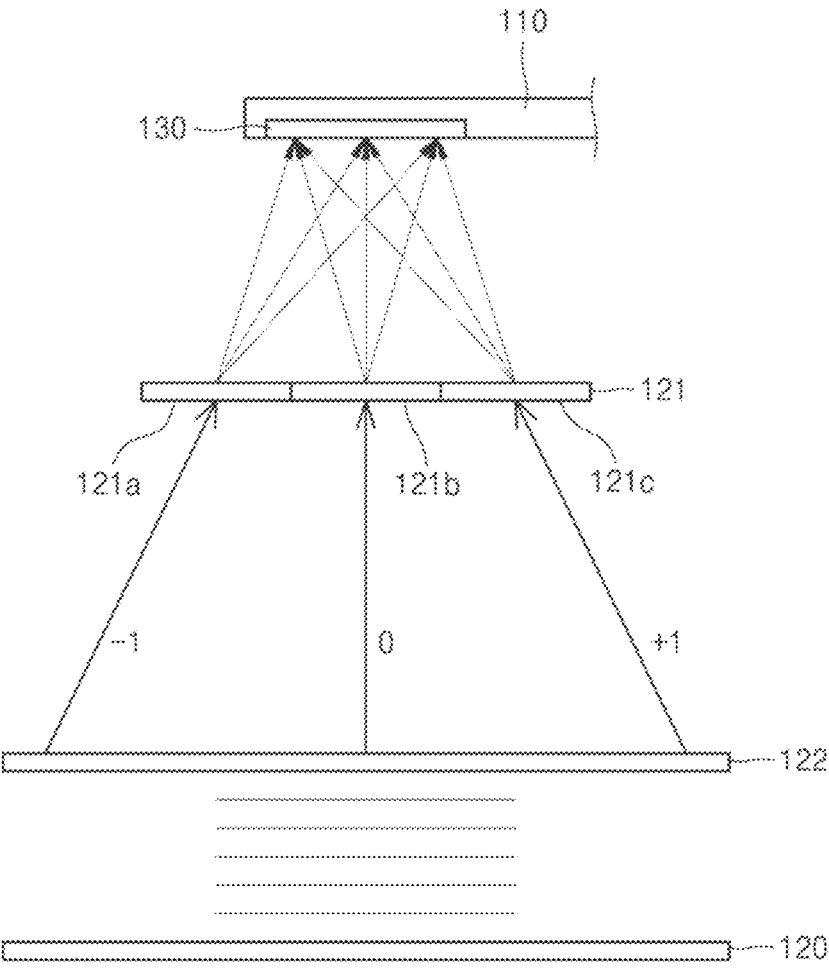
FIG. 7 shows an example of structures of an input coupler and an image providing apparatus of the display apparatus according to an example embodiment.

FIG. 7 shows an example of structures of the input coupler 130 and an image providing apparatus (e.g., elements 120, 121, and 122 of FIG. 7) of a display apparatus according to an example embodiment. Referring to FIG. 7, the image providing apparatus may be configured to provide a plurality of images traveling in different directions to the input coupler 130. Further, the input coupler 130 may be formed as one single DOE or one single HOE. Then, the plurality of images may be incident on the single input coupler 130 at different incidence angles. The propagating angle of the image coupled by the input coupler 130 and propagating in the light guide plate 110 may vary according to the incidence angle of the image with respect to the input coupler 130. Therefore, the plurality of images incident on the input coupler 130 at different incidence angles may propagate in the light guide plate 110 at different angles and then may be emitted from the output coupler 140 at different angles.

The image providing apparatus may include the spatial light modulator 121 disposed to face to the input coupler 130 and including the plurality of display regions 121*a*, 121*b*, and 121*c* providing a plurality of images, the light source 120 providing coherent illumination light to the spatial light modulator 121, and a diffraction grating 122 disposed between the light source 120 and the spatial light modulator 121. The diffraction grating 122 may be configured to make the traveling directions of illumination light incident on the plurality of display regions 121*a*, 121*b*, and 121*c* of the spatial light modulator 121 different from each other. To this end, the diffraction grating 122 may include a periodic diffraction pattern that diffracts incidence light in 0th order and higher order to transmit the incident light in different directions.

For example, among the illumination light emitted from the light source 120, light that is 0th order diffracted by the diffraction grating 122 may be incident perpendicularly to the second display region 121*b* in the center of the spatial light modulator 121. In addition, among the illumination light, light that is −1st order (i.e., first negative order) diffracted by the diffraction grating 122 may be slightly obliquely incident on the first display region 121*a* of the spatial light modulator 121 in the right direction as shown in FIG. 7. In addition, among the illumination light, light that is +1st order (i.e., first positive order) diffracted by the diffraction grating 122 may be slightly obliquely incident on the third display region 121*c* of the spatial light modulator 121 in the left direction.

Thereafter, the image reproduced by the first display region 121*a* of the spatial light modulator 121 may be slightly obliquely incident on the input coupler 130 in the right direction, the image reproduced by the second display region 121*b* may be incident perpendicularly to the input coupler 130, and the image reproduced by the third display region 121*c* may be slightly obliquely incident on the input coupler 130 in the left direction. Accordingly, the plurality of images respectively reproduced in the first to third display regions 121*a*, 121*b*, and 121*c* of the spatial light modulator 121 may be incident on the input coupler 130 at different angles.

In order to implement the above operation, as shown in FIG. 7, the size of the diffraction grating 122 is greater than that of the spatial light modulator 121. In addition, the size of the spatial light modulator 121 is greater than that of the input coupler 130. In particular, the width of the input coupler 130 may be smaller than the distance between the center of the first display region 121*a* and the center of the third display region 121*c* of the spatial light modulator 121. Further, the beam width of the illumination light emitted from the light source 120 is equal to or slightly smaller than the size of the diffraction grating 122. In particular, the beam width of the illumination light emitted from the light source 120 is greater than the size of the spatial light modulator 121. In addition, the input coupler 130, the spatial light modulator 121, the diffraction grating 122, and the light source 120 may be disposed such that the center of the input coupler 130, the center of the spatial light modulator 121, the center of the diffraction grating 122, and the center of the illumination light are collinear.

In this structure, part of the illumination light 0th order diffracted by the diffraction grating 122 may be incident on the first display region 121*a* or the third display region 121*c* of the spatial light modulator 121. However, as a result of the relative widths of the elements, the illumination light that is 0th order diffracted by the diffraction grating 122 and transmitted through the first display region 121*a* or the third display region 121*c* is not incident on the input coupler 130. Similarly, the illumination light that is −1st order diffracted by the diffraction grating 122 and transmitted through the second display region 121*b* or the third display region 121*c* is not incident on the input coupler 130, and the illumination light that is +1st order diffracted by the diffraction grating 122 and transmitted through the first display region 121*a* or the second display region 121*b* is not incident on the input coupler 130. Therefore, only the illumination light transmitted through the second display region 121*b* among the illumination light that is 0th order diffracted by the diffraction grating 122 may reach the viewer's eye E through the input coupler 130 and the light guide plate 110, only the illumination light transmitted through the first display region 121*a* among the illumination light that is −1st order diffracted by the diffraction grating 122 may reach the viewer's eye E through the input coupler 130 and the light guide plate 110, and the only the illumination light transmitted through the third display region 121*c* among the illumination light that is +1st order diffracted by the diffraction grating 122 may reach the viewer's eye E through the input coupler 130 and the light guide plate 110.

Figure 8:
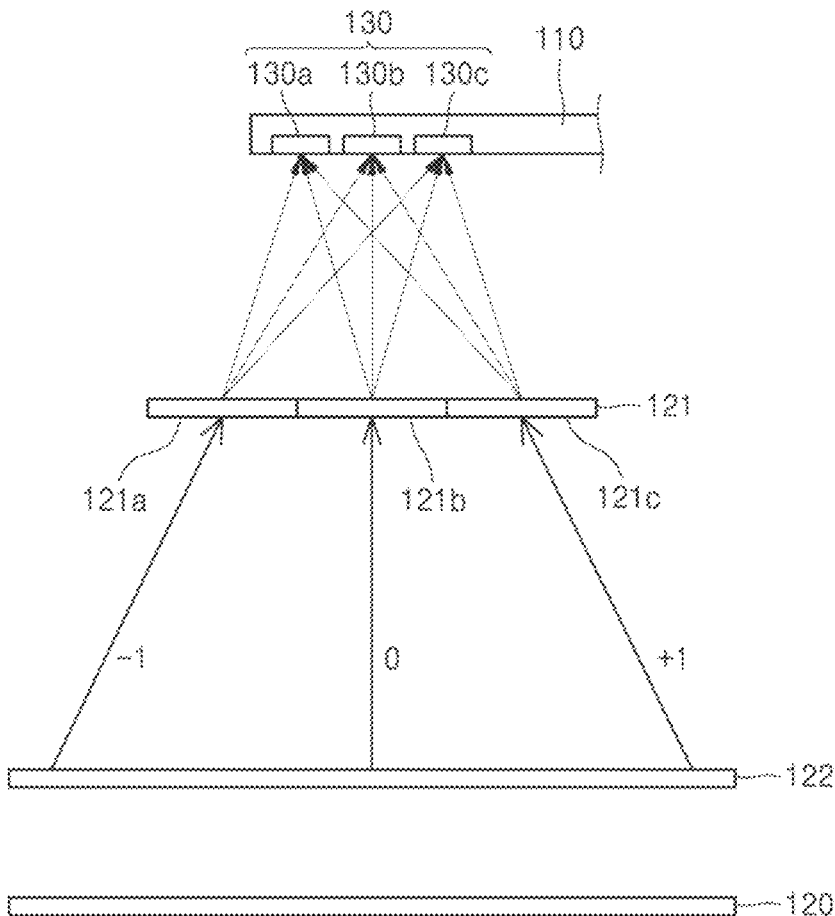
FIG. 8 shows an example of structures of an input coupler and an image providing apparatus of the display apparatus according to an example embodiment.

FIG. 8 shows an example of structures of the input coupler 130 and an image providing apparatus of a display apparatus according to an example embodiment. Referring to FIG. 8, the input coupler 130 may include a plurality of sub input couplers 130*a*, 130*b*, and 130*c* that couple incident light to the light guide plate 110 at different angles. For example, the input coupler 130 may include the first sub input coupler 130*a* corresponding to the first display region 121*a* of the spatial light modulator 121, the second sub input coupler 130*b* corresponding to the second display region 121*b*, and the third sub input coupler 130*c* corresponding to the third display region 121*c*. The size of the first display region 121*a* of the spatial light modulator 121 may be greater than the size of the first sub input coupler 130*a*, the size of the second display region 121*b* may be greater than the size of the second sub input coupler 130*b*, and the size of the third display region 121*c* may be greater than that of the third sub input coupler 130*c*. The structure of the image providing apparatus illustrated in FIG. 8 (e.g., elements 120, 121, and 122) may be the same as the structure of the image providing apparatus illustrated in FIG. 7.

Illumination light that is −1st order diffracted by the diffraction grating 122 and transmitted through the first display region 121*a* may be coupled in the light guide plate 110 through the first sub input coupler 130*a*. In addition, illumination light that is 0th order diffracted by the diffraction grating 122 and transmitted through the second display region 121*b* may be coupled in the light guide plate 110 through the second sub input coupler 130*b*, and illumination light that is +1st order diffracted by the diffraction grating 122 and transmitted through the third display region 121*c* may be coupled in the light guide plate 110 through the third sub input coupler 130*c*.

Figure 9:
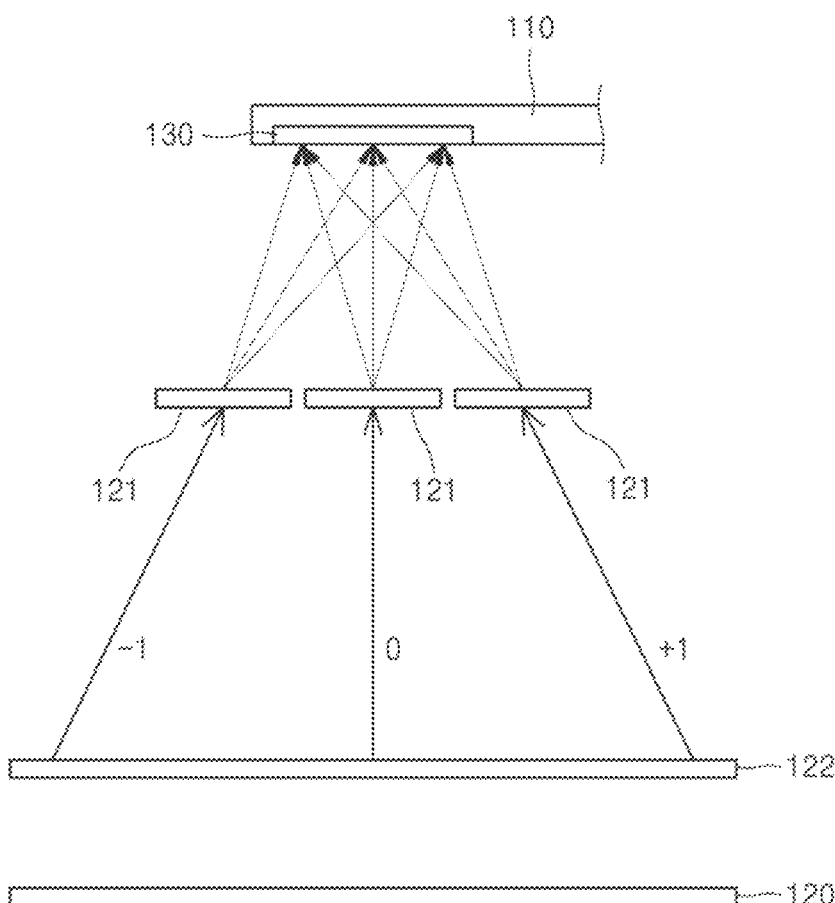
FIG. 9 shows an example of structures of an input coupler and an image providing apparatus of the display apparatus according to an example embodiment.

FIG. 9 shows an example of structures of the input coupler 130 and an image providing apparatus of a display apparatus according to an example embodiment. Referring to FIG. 9, the image providing apparatus may include a plurality of individual spatial light modulators 121 that are physically separated instead of a single spatial light modulator that has a plurality of display regions. The remaining structures of the input coupler 130 and the image providing apparatus shown in FIG. 9 are the same as described in FIG. 7.

Figure 10:
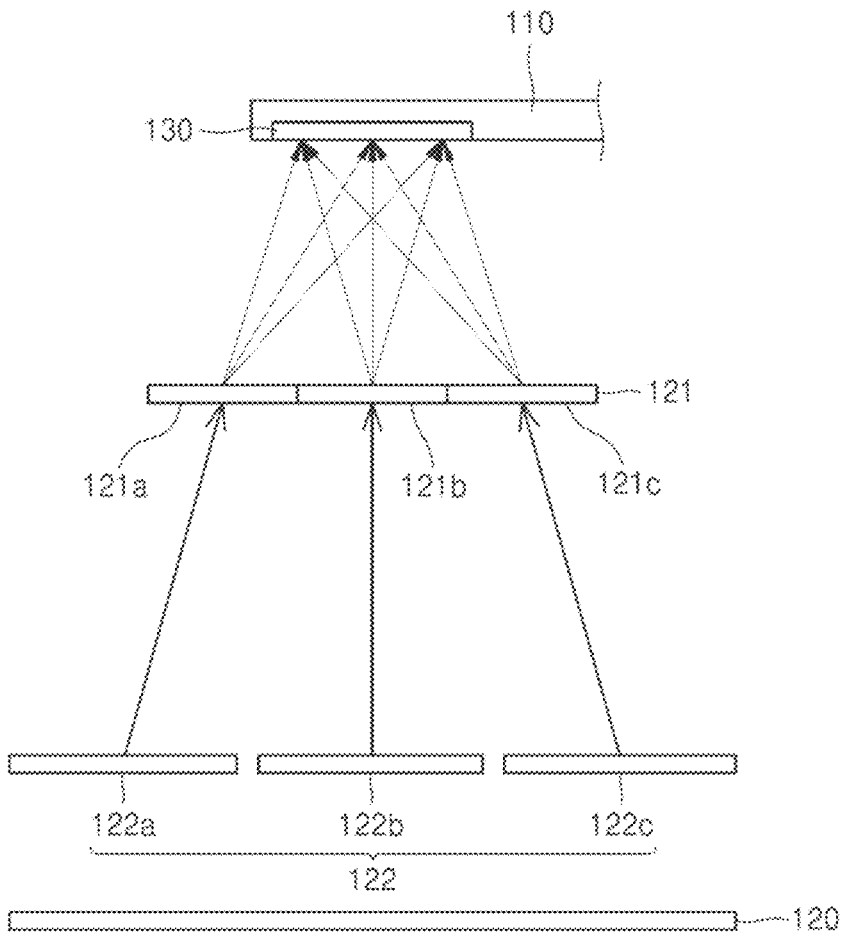
FIG. 10 shows an example of structures of an input coupler and an image providing apparatus of the display apparatus according to an example embodiment.

FIG. 10 shows an example of structures of the input coupler 130 and an image providing apparatus of a display apparatus according to an example embodiment. Referring to FIG. 10, the image providing apparatus may include a plurality of diffraction gratings 122*a*, 122*b*, and 122*c* respectively corresponding to the plurality of display regions 121*a*, 121*b*, and 121*c* of the spatial light modulator 121 instead of a single diffraction grating. For example, the image providing apparatus may include the first diffraction grating 122*a* corresponding to the first display region 121*a* of the spatial light modulator 121, the second diffraction grating 122*b* corresponding to the second display region 121*b*, and the third diffraction grating 122*c* corresponding to the third display region 121*c*. The remaining structures of the input coupler 130 and the image providing apparatus shown in FIG. 10 are the same as described in FIG. 7.

The first to third diffraction gratings 122*a*, 122*b*, and 122*c* may be configured to diffract illumination light in different directions. For example, the first diffraction grating 122*a* may slightly obliquely diffract most of the illumination light to the right as shown in FIG. 10 to be incident on the first display region 121*a*. In addition, the second diffraction grating 122*b* may diffract most of the illumination light to the front to be incident on the second display region 121*b*, and the third diffraction grating 122*c* may slightly obliquely diffract most of the illumination light to the left to be incident on the display region 121*c*. To this end, the first to third diffraction gratings 122*a*, 122*b*, and 122*c* may include periodic diffraction patterns that are different from each other.

Figure 11:
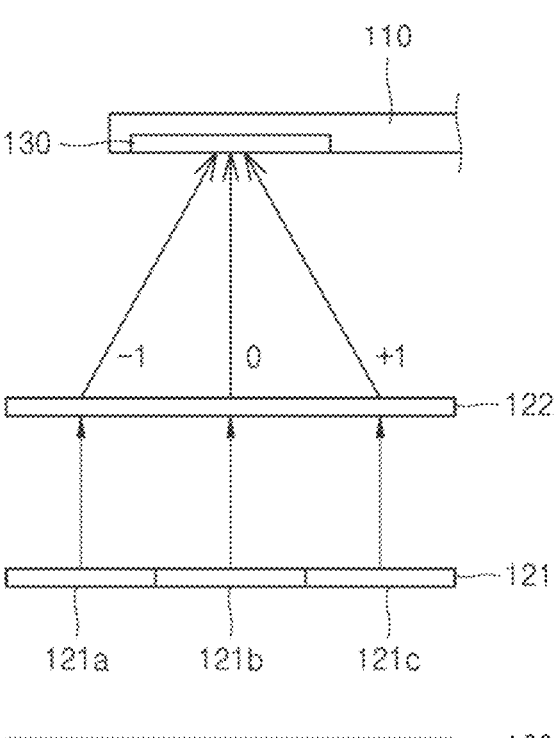
FIG. 11 shows an example of structures of an input coupler and an image providing apparatus of the display apparatus according to an example embodiment.

FIG. 11 shows an example of structures of the input coupler 130 and an image providing apparatus of a display apparatus according to an example embodiment. Referring to FIG. 11, the image providing apparatus may include the spatial light modulator 121 including the plurality of display regions 121*a*, 121*b*, and 121*c* providing a plurality of images, the light source 120 providing coherent illumination light to the spatial light modulator 121, and the diffraction grating 122 disposed between the input coupler 130 and the spatial light modulator 121.

The size of the diffraction grating 122 is greater than the size of the input coupler 130. The size of the spatial light modulator 121 may be equal to or slightly smaller than the size of the diffraction grating 122. Then, among images reproduced in the spatial light modulator 121, an image that is reproduced in the first display region 121*a* and −1st order diffracted by the diffraction grating 122 may be slightly obliquely incident on the input coupler 130 in the right direction as shown in FIG. 11. In addition, an image that is reproduced in the second display region 121*b* and 0th order diffracted by the diffraction grating 122 may be incident perpendicularly to the input coupler 130, and an image that is reproduced in the third display region 121*c* and +1st order diffracted by the diffraction grating 122 may be slightly obliquely incident on the input coupler 130 in the left direction. Accordingly, the propagating directions of the plurality of images incident on the input coupler 130 from the plurality of display regions 121*a*, 121*b*, and 121*c* of the spatial light modulator 121 may be different from each other. The remaining structure of the display apparatus illustrated in FIG. 11 that is not described is the same as that of the display apparatus illustrated in FIG. 7.

Figure 12:
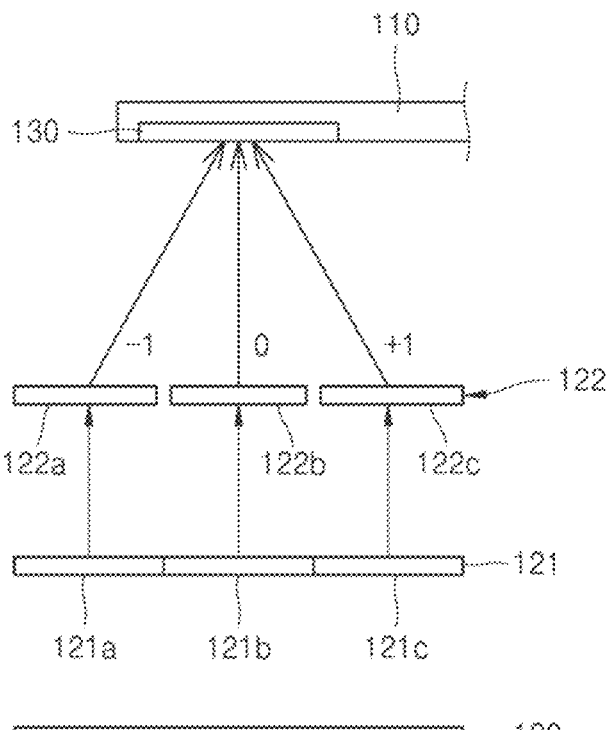
FIG. 12 shows an example of structures of an input coupler and an image providing apparatus of the display apparatus according to an example embodiment.

FIG. 12 shows an example of structures of the input coupler 130 and an image providing apparatus of a display apparatus according to an example embodiment. Referring to FIG. 12, the image providing apparatus may include the spatial light modulator 121 including the plurality of display regions 121*a*, 121*b*, and 121*c* each providing a plurality of images, the light source 120 providing coherent illumination light to the spatial light modulator 121, and the plurality of diffraction gratings 122*a*, 122*b*, and 122*c* disposed between the input coupler 130 and the spatial light modulator 121 and respectively corresponding to the plurality of display regions 121*a*, 121*b*, and 121*c* of the spatial light modulator 121. For example, the image providing apparatus may include the first diffraction grating 122*a* corresponding to the first display region 121*a* of the spatial light modulator 121, the second diffraction grating 122*b* corresponding to the second display region 121*b*, and the third diffraction grating 122*c* corresponding to the third display region 121*c*.

The first to third diffraction gratings 122*a*, 122*b*, and 122*c* may be configured to diffract incident light in different directions. For example, the first diffraction grating 122*a* may slightly obliquely diffract an image reproduced in the first display region 121*a* of the spatial light modulator 121 to the right as shown in FIG. 12 to be incident on the input coupler 130. In addition, the second diffraction grating 122*b* may diffract an image reproduced in the second display region 121*b* to the front to be incident on the input coupler 130, and the third diffraction grating 122*c* may slightly obliquely diffract an image reproduced in the third display region 121*c* to the left to be incident on the input coupler 130. To this end, the first to third diffraction gratings 122*a*, 122*b*, and 122*c* may include periodic diffraction patterns that are different from each other. The remaining structure of the display apparatus illustrated in FIG. 12 that is not described is the same as that of the display apparatus illustrated in FIG. 11.

Figure 13:
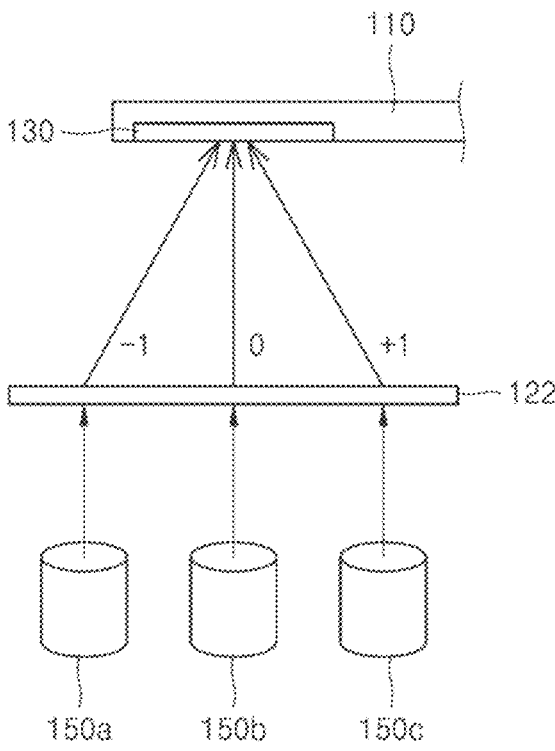
FIG. 13 shows an example of structures of an input coupler and an image providing apparatus of the display apparatus according to an example embodiment.

FIG. 13 shows an example of structures of the input coupler 130 and an image providing apparatus of a display apparatus according to an example embodiment. Referring to FIG. 13, the image providing apparatus may include a plurality of image scanners 150*a*, 150*b*, and 150*c* disposed to face the input coupler 130 and providing a plurality of images, and the diffraction grating 122 disposed between the plurality of image scanners 150*a*, 150*b*, and 150*c* and the input coupler 130 to make the direction of the images incident on the input coupler 130 from the plurality of image scanners 150*a*, 150*b*, and 150*c* different from each other. The plurality of image scanners 150*a*, 150*b*, and 150*c* may include a first image scanner 150*a*, a second image scanner 150*b*, and a third image scanner 150*c*.

An image that is generated by the first image scanner 150*a* and −1st order diffracted by the diffraction grating 122 may be slightly obliquely incident on the input coupler 130 in the right direction as shown in FIG. 13. In addition, an image that is generated by the second image scanner 150*b* and 0th order diffracted by the diffraction grating 122 may be incident perpendicularly to the input coupler 130, and an image that is generated by the third image scanner 150*c* and +1st order diffracted by the diffraction grating 122 may be slightly obliquely incident on the input coupler 130 in the left direction. Accordingly, the propagating directions of the plurality of images incident on the input coupler 130 from the plurality of image scanners 150*a*, 150*b*, and 150*c* may be different from each other.

Further, the plurality of diffraction gratings 122*a*, 122*b*, and 122*c* shown in FIG. 12 may be used instead of the single diffraction grating 122 shown in FIG. 13. In other words, the spatial light modulator 121 and the light source 120 illustrated in FIG. 12 may be replaced with the plurality of image scanners 150*a*, 150*b*, and 150*c* illustrated in FIG. 13. In this case, the first image scanner 150*a* may be disposed to face the first diffraction grating 122*a*, the second image scanner 150*b* may be disposed to face the second diffraction grating 122*b*, and the third image scanner 150*c* may be disposed to face the third diffraction grating 122*c*.

Figure 14:
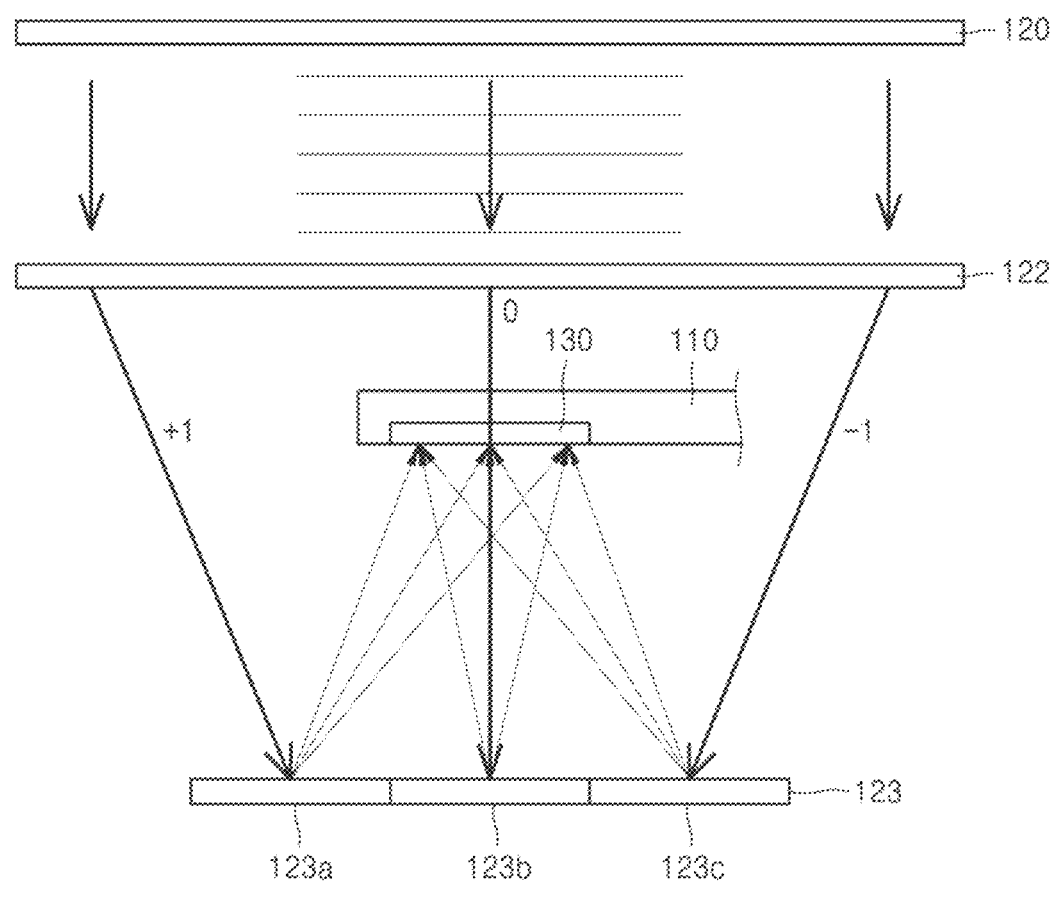
FIG. 14 shows an example of structures of an input coupler and an image providing apparatus of the display apparatus according to an example embodiment.

FIG. 14 shows an example of structures of the input coupler 130 and an image providing apparatus of a display apparatus according to an example embodiment. Referring to FIG. 14, the image providing apparatus may include the spatial light modulator 123 disposed to face the input coupler 130 and having the plurality of display regions 123*a*, 123*b*, and 123*c*, the light source 120 providing coherent illumination light to the spatial light modulator 123, and the diffraction grating 122 making the traveling direction of the illumination light incident on each of the plurality of display regions 123*a*, 123*b*, and 123*c* of the spatial light modulator 123 different from each other. The light guide plate 110 is disposed between the light source 120 and the spatial light modulator 123, and the diffraction grating 122 is disposed between the light source 120 and the light guide plate 110. The spatial light modulator 123 is a reflective spatial light modulator that reflects and modulates illumination light.

The illumination light that is −1st order diffracted by the diffraction grating 122 may be reflected from the first display region 123*a* of the spatial light modulator 123 to be slightly obliquely incident on the input coupler 130 to the right as shown in FIG. 14. The illumination light that is 0th order diffracted by the diffraction grating 122 may pass through the input coupler 130 and be reflected from the second display region 123*b* of the spatial light modulator 123 to be incident perpendicularly on the input coupler 130. The input coupler 130 may be configured to couple only incident light traveling in a direction from the spatial light modulator 123 and to transmit incident light traveling in a direction from the diffraction grating 122. The illumination light that is +1st order diffracted by the diffraction grating 122 may be reflected from the third display region 123*c* of the spatial light modulator 123 to be slightly obliquely incident on the input coupler 130 to the left.

Figures 15, 16:
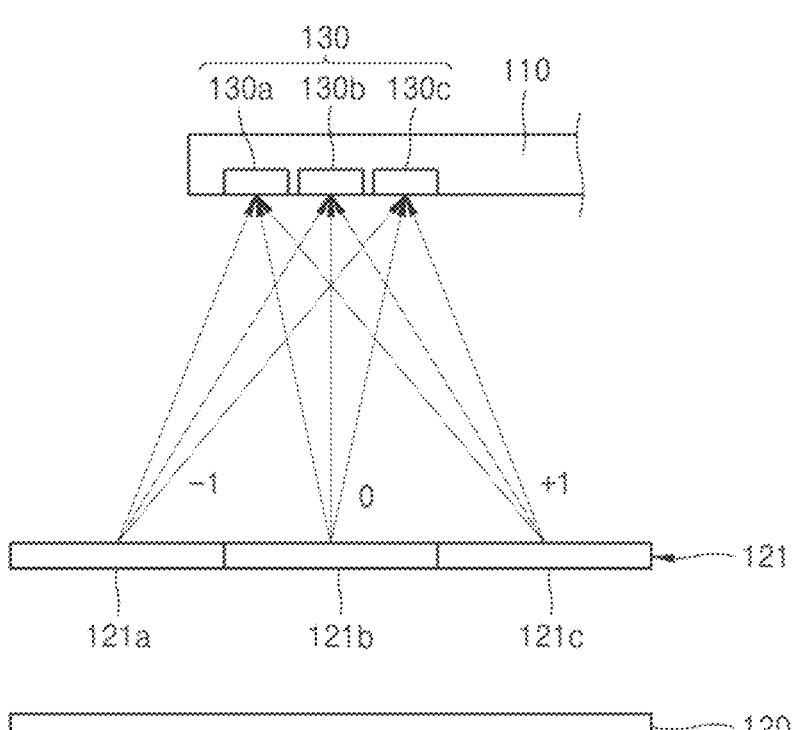
FIG. 15 shows an example of structures of an input coupler and an image providing apparatus of the display apparatus according to an example embodiment.
FIG. 16 shows an example of structures of an input coupler and an image providing apparatus of the display apparatus according to an example embodiment.

FIG. 15 shows an example of structures of the input coupler 130 and an image providing apparatus of a display apparatus according to an example embodiment. Referring to FIG. 15, the image providing apparatus may include the spatial light modulator 121 disposed to face the input coupler 130 and including the plurality of display regions 121*a*, 121*b*, and 121*c* and the light source 120 providing coherent illumination light to the spatial light modulator 121.

The spatial light modulator 121 may also serve as a periodic diffraction grating due to the physical pixel structure therein. Accordingly, images reproduced in each of the plurality of display regions 121*a*, 121*b*, and 121*c* may include an image formed by diffraction light that is 0th order diffracted and images formed by diffraction light that is ±1st or higher order diffracted due to the physical pixel structure of the inside of the spatial light modulator 121. The spatial light modulator 121 may be disposed such that images formed by diffraction light of different orders in the plurality of display regions 121*a*, 121*b*, and 121*c* are incident on the input coupler 130. For example, the spatial light modulator 121 may be disposed such that among the images reproduced in the first display region 121*a* of the spatial light modulator 121, an image that is −1st order diffracted may be slightly obliquely incident on the input coupler 130 to the right as shown in FIG. 15, among the images reproduced in the second display region 121*b*, an image that is 0th order diffracted may be perpendicularly incident on the input coupler 130, and among the images reproduced in the third display region 121*c*, an image that is +1st order diffracted may be slightly obliquely incident on the input coupler 130 to the left. To this end, the size of the spatial light modulator 121 is greater than that of the input coupler 130. Also, the spatial light modulator 121 may be disposed such that the center of the second display region 121*b* is collinear with the center of the input coupler 130 and with a normal line extending between the center of the display region 121*b* and the center of the input coupler 130.

FIG. 16 shows an example of structures of the input coupler 130 and an image providing apparatus of a display apparatus according to an example embodiment. Referring to FIG. 16, the input coupler 130 may include the plurality of sub input couplers 130*a*, 130*b*, and 130*c* that couple incident light in the light guide plate 110 at different angles. For example, the input coupler 130 may include the first sub input coupler 130*a* corresponding to the first display region 121*a* of the spatial light modulator 121, the second sub input coupler 130*b* corresponding to the second display region 121*b*, and the third sub input coupler 130*c* corresponding to the third display region 121*c*. The structure of the image providing apparatus illustrated in FIG. 16 may be the same as that of the image providing apparatus illustrated in FIG. 15.

Among images reproduced in the first display region 121*a* of the spatial light modulator 121, an image that is −1st order diffracted may be incident on the first sub input coupler 130*a*. In addition, among images reproduced in the second display region 121*b*, an image that is 0th order diffracted may be incident on the second sub input coupler 130*b*. In addition, among images reproduced in the third display region 121*c*, an image that is +1st order diffracted may be coupled in the light guide plate 110 through the third sub input coupler 130*c*. To this end, the size of the first display region 121*a* may be greater than the size of the first sub input coupler 130a, the size of the second display region 121b may be greater than the size of the second sub input coupler 130b, and the size of the third display region 121c may be greater than the size of the third sub input coupler 130c.

Figure 17:
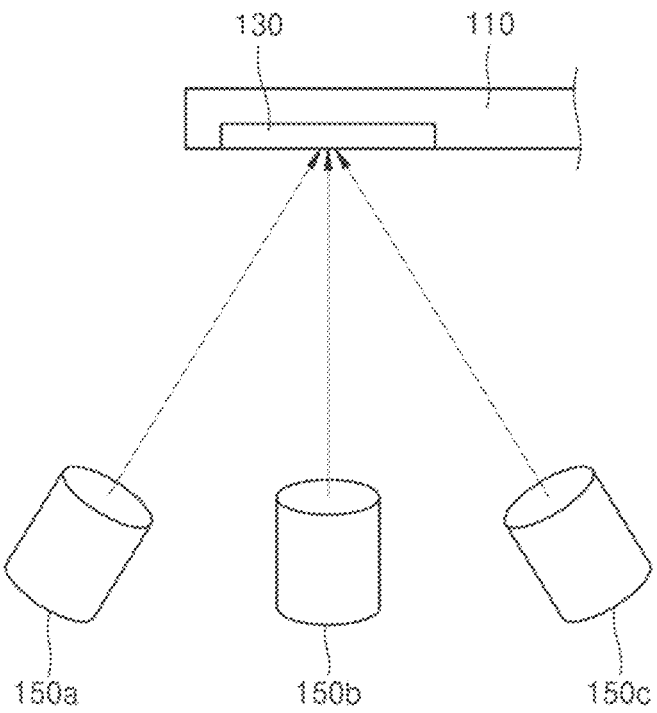
FIG. 17 shows an example of structures of an input coupler and an image providing apparatus of the display apparatus according to an example embodiment.

FIG. 17 shows an example of structures of the input coupler 130 and an image providing apparatus of a display apparatus according to an example embodiment. Referring to FIG. 17, the image providing apparatus may include the plurality of image scanners 150a, 150b, and 150c disposed to face the input coupler 130 and each providing a plurality of images. The plurality of image scanners 150a, 150b, and 150c may be arranged to make images that are incident on the input coupler 130 at different angles. For example, among the plurality of image scanners 150a, 150b, and 150c, the first image scanner 150a may be arranged to make the image slightly obliquely incident on the input coupler 130 to the right as shown in FIG. 17, the second image scanner 150b may be arranged to make the image perpendicularly incident on the input coupler 130, and the third image scanner 150c may be arranged to make the image slightly obliquely incident on the input coupler 130 to the left. For example, the optical axes of the plurality of image scanners 150a, 150b, and 150c may be inclined at angles different from each other to cause the angles of incidence of the images on the input coupler 130 to be different from each other.

Figure 18:
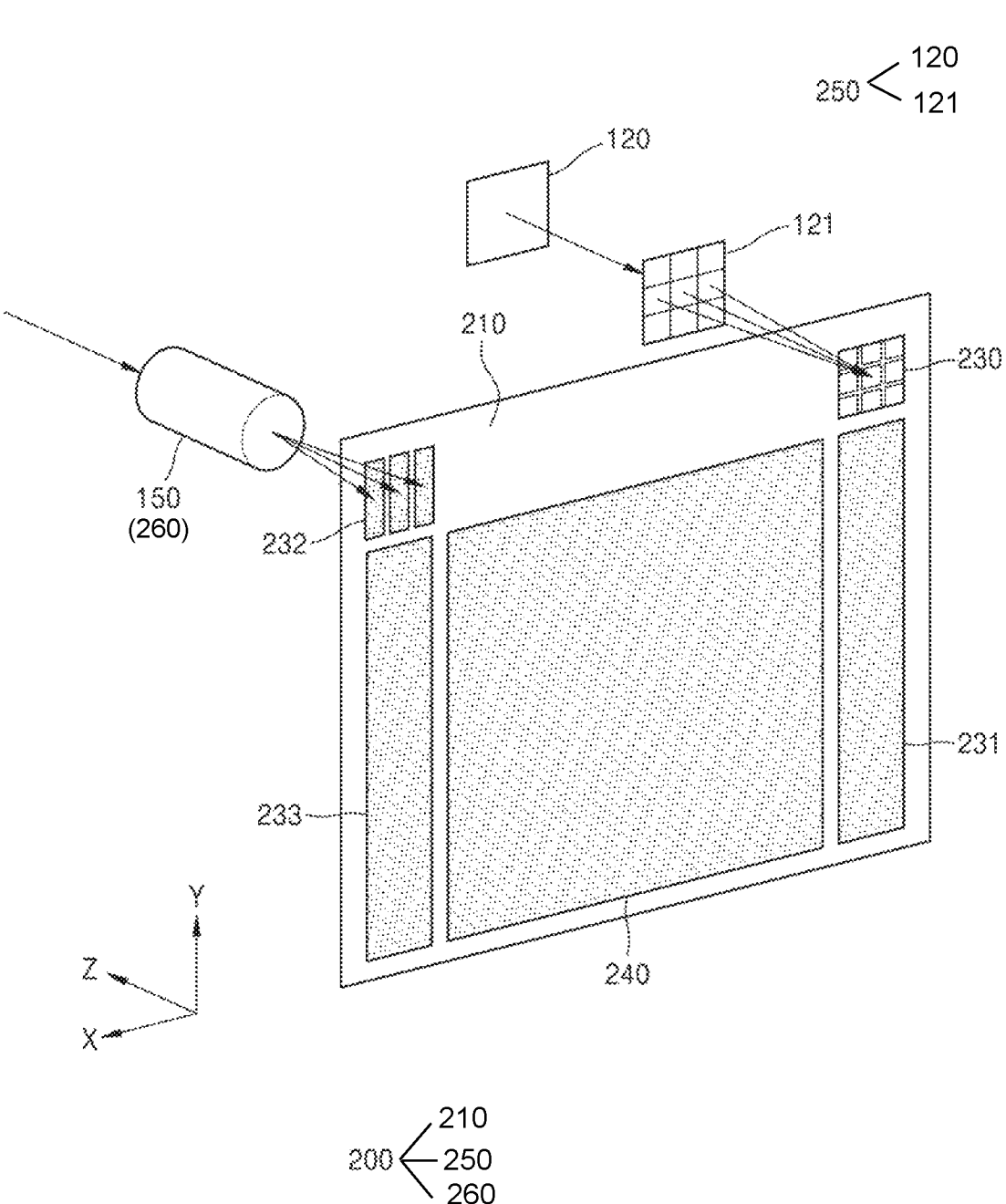
FIG. 18 schematically shows a structure of a display apparatus according to an example embodiment.

FIG. 18 schematically shows a structure of a display apparatus 200 according to an example embodiment. Referring to FIG. 18, the display apparatus 200 may include the light guide plate 210, a first image providing apparatus 250, and a second image providing apparatus 260. The light guide plate 210 may include the first input coupler 230 corresponding to the first image providing apparatus 250, a second input coupler 232 corresponding to the second image providing apparatus 260, a first intermediate coupler 231, a second intermediate coupler 233 and the output coupler 240. The first image providing apparatus 250 may be disposed to face the first input coupler 230, and the second image providing apparatus 260 may be disposed to face the second input coupler 232. The first and second input couplers 230 and 232 may have a structure of an input coupler according to any one or more of the above-described example embodiments.

The first intermediate coupler 231 is disposed in an optical path between the first input coupler 230 and the output coupler 240, and the second intermediate coupler 233 is disposed in an optical path between the second input coupler 232 and the output coupler 240. The first input coupler 230 may be configured such that an image incident thereon propagates in the −y direction as shown in FIG. 18 toward the first intermediate coupler 231 in the light guide plate 210. The first intermediate coupler 231 is configured such that an image from the first input coupler 230 propagates in the +x direction perpendicular to the −y direction toward the output coupler 240 in the light guide plate 210. The output coupler 240 is configured to output an image from the first intermediate coupler 231 to the outside of the light guide plate 210 along the +z direction perpendicular to both the −y direction and the +x direction. In addition, the second input coupler 232 may be configured such that an image incident thereon propagates in the −y direction toward the second intermediate coupler 233 in the light guide plate 210. The second intermediate coupler 233 is configured such that the image from the second input coupler 232 propagates in the −x direction perpendicular to the −y direction toward the output coupler 240 in the light guide plate 210. In addition, the output coupler 240 is configured to output an image from the second intermediate coupler 233 to the outside of the light guide plate 210 along the +z direction perpendicular to the −y direction and the −x direction.

The first and second intermediate couplers 231 and 233 serve to extend a viewing window in the y direction. To this end, the lengths of the first and second intermediate couplers 231 and 233 along the y direction may be greater than the lengths of the first and second input couplers 230 and 232 along the y direction. The lengths of the first and second intermediate couplers 231 and 233 along the x direction are the same as the lengths of the first and second input couplers 230 and 232 along the x direction. The output coupler 240 serves to extend the viewing window in the x direction. To this end, the length of the output coupler 240 along the x direction is greater than the lengths of the first and second intermediate couplers 231 and 233 along the x direction. The length of the output coupler 240 along the y direction is the same as the lengths of the first and second intermediate couplers 231 and 233 along the y direction. Therefore, the viewing windows may be extended in two directions perpendicular to each other by the first and second intermediate couplers 231 and 233 and by the output coupler 240.

The first image providing apparatus 250 may include the spatial light modulator 121 disposed to face the first input coupler 230 and the light source 120 providing coherent illumination light to the spatial light modulator 121. The first image providing apparatus 250 may further include the diffraction grating 122. The first image providing apparatus 250 may be, for example, any one of the image providing apparatuses illustrated in FIGS. 1 to 5, 7 to 12, and 14 to 16. The second image providing apparatus 260 may include the image scanner 150 disposed to face the second input coupler 232. The second image providing apparatus 220 may be, for example, any one of the image providing apparatuses illustrated in FIGS. 6, 13, and 17.

Figure 19:
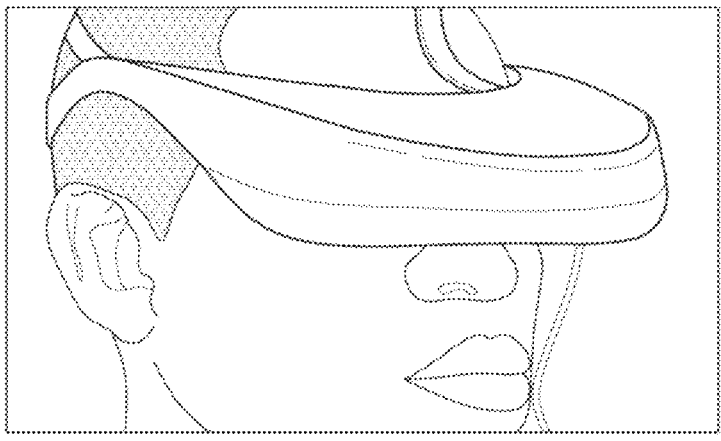
FIGS. 19 to 21 illustrate examples of various electronic devices employing a display apparatus according to example embodiments.
Figure 20:
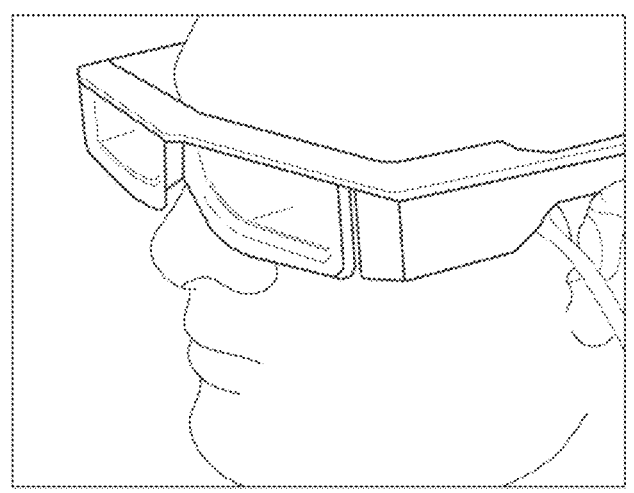
Figure 21:
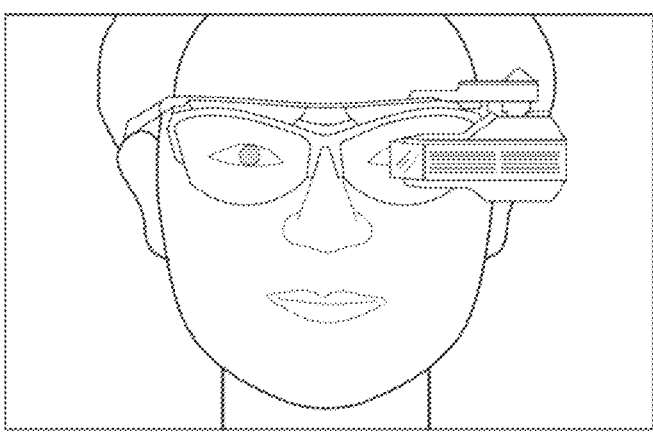

As described above, a display apparatus may be used to implement AR and MR. For example, FIGS. 19 to 21 illustrate examples of various electronic devices employing a display apparatus according to the above-described example embodiments. As illustrated in FIGS. 19 to 21, the display apparatus may constitute a wearable apparatus. In other words, the display apparatus may be applied to a wearable apparatus. For example, the display apparatus may be applied to a head mounted display (i.e., head mounted device). In addition, the display apparatus may be applied to a glasses-type display (i.e., glasses device), a goggle-type display (i.e., goggles device), etc. The wearable electronic devices shown in FIGS. 19 to 21 may operate in conjunction with smart phones. The display apparatus may be a VR display apparatus, AR display apparatus, or MR display apparatus of a head-mounted type or a glasses or goggle type capable of providing virtual reality or providing a virtual image together with an external real image.

While display apparatuses for providing an expanded viewing window have been described according to example embodiments with reference to the accompanying drawings, it should be understood that the example embodiments described herein should be considered in a descriptive sense only and not for purposes of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope as defined by the following claims.

What is claimed is:

1. A display apparatus comprising:

a light guide plate comprising an input coupler and an output coupler; and an image providing apparatus configured to provide a plurality of images traveling in different directions to the input coupler, wherein the image providing apparatus comprises:

a spatial light modulator facing the input coupler and comprising a plurality of display regions configured to provide the plurality of images to the input coupler; and a light source configured to provide coherent illumination light to the spatial light modulator, wherein the spatial light modulator is provided such that each display region of the plurality of display regions is configured to provide a respective image to the input coupler, each respective image being formed by a different respective diffraction order, wherein the input coupler comprises a first sub input coupler, a second sub input coupler, and a third sub input coupler configured to propagate an image provided from the image providing apparatus at different angles in the light guide plate, wherein the plurality of display regions of the spatial light modulator comprises a first display region, a second display region, and a third display region corresponding to the first sub input coupler, the second sub input coupler, and the third sub input coupler, respectively, and wherein the first display region is configured such that a first image is obliquely incident on the first sub input coupler from the first display region, the second display region is configured such that a second image is perpendicularly incident on the second sub input coupler from the second display region, and the third display region is configured such that a third image is obliquely incident on the third sub input coupler.

2. The display apparatus of claim 1, wherein a size of the spatial light modulator is larger than a size of the input coupler.

3. The display apparatus of claim 1, wherein the plurality of display regions of the spatial light modulator comprises the first display region configured to provide the first image formed by a −1st order diffraction of the coherent illumination light to the input coupler, the second display region configured to provide the second image formed by a 0th order diffraction of the coherent illumination light to the input coupler, and the third display region configured to provide the third image formed by a +1st order diffraction of the coherent illumination light to the input coupler.

4. The display apparatus of claim 3, wherein the spatial light modulator is provided such that a center of the second display region is aligned with a center of the input coupler.

5. The display apparatus of claim 3, wherein the input coupler is configured such that the first image, the second image, and the third image, which are incident on the input coupler at different angles, propagate in the light guide plate at different angles.

6. The display apparatus of claim 5, wherein the output coupler is configured such that the first image, the second image, and the third image are emitted at different angles through the output coupler.

7. The display apparatus of claim 1, wherein the plurality of display regions respectively correspond to a plurality of sub input couplers.

8. The display apparatus of claim 7, wherein the first sub input coupler is configured to receive the first image that is −1st order diffracted by the first display region, the second sub input coupler is configured to receive the second image that is 0th order diffracted by the second display region, and the third sub input coupler is configured to receive the third image that is +1st order diffracted by the third display region.

9. The display apparatus of claim 8, wherein a size of the first display region is greater than a size of the first sub input coupler, a size of the second display region is greater than a size of the second sub input coupler, and a size of the third display region is greater than a size of the third sub input coupler.

10. The display apparatus of claim 8, wherein the first sub input coupler is configured to incline a direction of the first image by a first angle to provide the first image to the light guide plate, the second sub input coupler is configured to incline a direction of the second image by a second angle different from the first angle to provide the second image to the light guide plate, and the third sub input coupler is configured to incline a direction of the third image by a third angle different from the first angle and the second angle to provide the third image to the light guide plate.

11. The display apparatus of claim 8, wherein the output coupler is configured such that the first image, the second image, and the third image are emitted at different angles through the output coupler.

* * * * *